United States Patent [19]

Forgione

[11] 3,875,014

[45] Apr. 1, 1975

[54] GLUTAMIC OXALOACETIC TRANSAMINASE TEST MATERIAL

[75] Inventor: Peter Salvatore Forgione, Stamford, Conn.

[73] Assignee: American Cyanamid Company, Stamford, Conn.

[22] Filed: Dec. 14, 1973

[21] Appl. No.: 424,971

[52] U.S. Cl......... 195/103.5 R, 23/253 TP, 195/99, 195/127
[51] Int. Cl............................ C12k 1/04, C07g 7/02
[58] Field of Search..................... 195/103.5 R, 127; 23/253 TP, 230 B

[56] References Cited
UNITED STATES PATENTS

| | | | |
|---|---|---|---|
| 2,999,052 | 9/1961 | Albaum et al. | 195/103.5 R |
| 3,069,330 | 12/1962 | Babson | 195/103.5 R |
| 3,672,845 | 6/1972 | Verbeck | 23/253 TP |
| 3,694,163 | 9/1972 | Sherelis | 195/103.5 R |

*Primary Examiner*—David M. Naff
*Assistant Examiner*—C. A. Fan
*Attorney, Agent, or Firm*—Frank M. Van Riet

[57] ABSTRACT

A diagnostic test indicator for the detection and determination of the concentration of glutamic oxaloacetic transaminase in sera comprising a pair of bibulous materials, the first one of which has contained therein the dried residue resulting from the impregnation thereof with 1. L-aspartic acid and
2. α-ketoglutaric acid and the second of which has contained therein the dried residue resulting from the impregnation thereof with
3. a diazonium salt, and a process for the production of said indicator, are disclosed.

12 Claims, No Drawings

GLUTAMIC OXALOACETIC TRANSAMINASE TEST MATERIAL

BACKGROUND OF THE INVENTION

The use of diagnostic tests in the clinical testing of patients has become increasingly common in recent years. Many of these tests employ the use of test papers wherein the individual conducting the test merely contacts a reactive paper strip with a suspect material, usually a body fluid, and observes the color change or color intensity thereof in order to determine whether or not a particular effect is achieved. Test strips or cards of this type have been devised for glucose determination and treponemal diseases, for example.

Available tests for the detection of the concentration of glutamic oxaloacetic transaminase in body fluids have, until now, consisted of extremely complex liquid or tablet systems whereby cuvettes, devices such as spectrophotometers, ultraviolet light, timing instruments, constant temperature devices and individual standardizations prevail. There has therefore existed, for a substantial period of time, the need for a simple testing mechanism for the determination of the concentration of serum glutamic oxaloacetic transaminase, which long-felt need is satisfied by the instant invention more fully discussed hereinbelow.

SUMMARY

As mentioned briefly above, I have now discovered a novel test means for the determination of the concentration of glutamic oxaloacetic transaminase in body fluids. My test means is useful for the qualitative detection and quantitative determination of serum glutamic oxaloacetic transaminase wherein the test means comprises reagent compositions incorporated within a pair of bibulous carriers.

The quantitative determination of serum glutamic oxaloacetic transaminase is extremely important in the detection of heart and liver diseases, in that the concentration of glutamic oxaloacetic transaminase in the blood is elevated noticeably over its normal concentration when diseases of the heart and liver exist. The early detection of such an abnormal rise in serum glutamic oxaloacetic transaminase concentration can therefore obviously lead to a more accurate and rapid diagnosis of heart and liver maladies and consequently, the more rapid treatment thereof.

Because early diagnosis of abnormal heart and liver conditions is so important, a test for the detection of variables in the concentration of glutamic oxaloacetic transaminase in the blood must be rapid and simple enough for the clinician to carry out but accurate enough to enable the diagnosis to be made without extreme chances of error or false readings. Such a mechanism is represented by the novel test indicators of the present invention. Utilizing my novel system, no instrumentation is necessary and no mixing or reconstitution of reagents is needed. Testing can therefore be conducted at home or in the doctor's office without any special equipment.

In the normal solution testing of serum glutamic oxaloacetic transaminase, reagent incompatibility is not a problem. However, incorporation of the solution reagents in a bibulous system presents serious instability problems even during short term storage thereof since the color indicator, a diazonium salt, is unstable at the pH at which the test must be carried out. I have overcome this serious problem by incorporating the reagent components in individual bibulous strata, each of which is at its own stable pH, which are separated by a barrier adhesive layer permeable only to oxaloacetic acid and the buffer included in the acid containing bibulous layer.

DESCRIPTION OF THE INVENTION INCLUDING PREFERRED EMBODIMENTS

The novel diagnostic test indicators for the determination of the concentration of serum glutamic oxaloacetic transaminase, hereinafter sometimes referred to as SGOT, comprise a pair of bibulous carrier materials, such as cellulosic papers, which contain therein the dried residue resulting from the impregnation thereof with various reagent materials.

In the preparation of my novel indicators, the first bibulous material is impregnated with an aqueous solution of L-aspartic acid and α-ketoglutaric acid. These acids may be incorporated into the first bibulous material as individual solutions in water, but it is preferred that they be used in admixture with one another for purposes of convenience and economy. The L-aspartic acid is employed in concentrations ranging from about 0.05 molar to about 0.2 molar and the α-ketoglutaric acid is employed in concentrations ranging from about 0.01 molar to about 0.05 molar. The mole ratio of L-aspartic acid to α-ketoglutaric acid ranges from about 20:1 to about 5:1, respectively.

These two acids must be applied to the bibulous material so that the resultant dried residue on the material has a pH ranging from about 6.5 to about 9.5. I have found that this can be accomplished by buffering the solution of acids with a buffer such that the pH of the buffer solution ranges from about 7.5 to about 10.0. Impregnation and drying of the bibulous material with such a solution results in the desired pH range on the resultant bibulous material.

Examples of suitable buffers include phosphate buffer, phthalate buffer, "tris" buffer, glycine, citrate-phosphate buffer, borate-succinate buffer and the like. The preferred buffer is phosphate buffer in from about 0.05 to about 0.3 M concentrations.

The second bibulous material is then impregnated with an aqueous solution of a diazonium salt. This material is capable of imparting to the area of the second bibulous material which comes into contact with oxaloacetic acid, a color of such varying intensity as to be representative of the concentration of the SGOT which is added to the first bibulous material. The diazonium salts are well known in the art and generally have the formula (I)

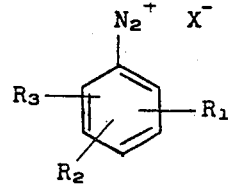

wherein R, $R_2$ and $R_3$ are, individually, H, Br, I, $NO_2$, Cl, $CH_3$, $OCH_3$, $OC_2H_5$, $NHCOC_6H_5$, or $SO_3H$ and $X^-$ is $Cl^-$, $Br^-$, $F^-$, $BF_4^-$, the double salts of $ZnCl_2$, $MgCl_2$, $AlCl_3$, and $SnCl_4$ or alkyl and aryl sulfonate salts. These salts are incorporated into the novel test indicators of the present invention in concentrations ranging from about 0.05 part to about 3.0 parts thereof per 100 parts of water used.

The impregnation time of either of the impregnations discussed above is not critical as long as the bibulous material is fully saturated by the solution with which it is contacted. Generally, submersion of the bibulous material in the solution for from about 5 to 15 minutes is sufficient in both cases.

Additionally, I have found that the stability of my novel test indicators can be greatly enhanced by the incorporation of a stabilizing amount of starch, urea or mixtures thereof into the diazonium salt solution before impregnating the bibulous carrier material therewith. The concentration of the starch, urea or mixture thereof used should range from about 1 to about 5 percent by weight, with ratios of starch to urea in admixtures thereof ranging from about 10:1 to about 1:10, respectively. These additives impart excellent stability to the test indicators especially when they are stored at 10°C., and preferably over a drying agent.

If starch or a mixture of starch and urea is to be used in stabilizing the diazonium salt, it is necessary that the starch be added to the water first. After the starch is added to the water, the suspension is warmed in order to effect dissolution of the starch. The resultant solution is then cooled before the diazonium salt is added thereto. If desired, of course, the starch solution can be prepared first and then added to a solution of the diazonium salt in such a concentration that the final starch and salt concentrations fall within the above-specified limits.

The pH of the diazonium salt impregnated bibulous material should range from about 2.5 to about 4.5, the diazonium salt solution being adjustable to such a pH by the addition of an acid, such as hydrochloric acid, thereto before impregnation.

Both the diazonium salt containing bibulous material and the L-aspartic acid/α-ketoglutaric acid containing material may be prepared utilizing a suitable non-ionic wetting agent in the impregnating solution so as to assure complete coverage of the surface of the bibulous materials when contacting them with the solutions. For instance, I may utilize the fatty alkanolamides, i.e. the alkanolamine reaction products with fatty acids such as lauric acid or stripped coconut fatty acid, suitable alkanolamines being diethanolamine, monoethanolamine, monoisopropanolamine etc.; ethylene oxide derived materials, i.e. those derived from the reaction of ethylene oxide with alkylphenols wherein the alkyl group is octyl, nonyl or higher, long chain fatty alcohols such as tridecyl alcohol, lanolin, lecithin alcohol, etc., long chain fatty acids such as tall oil, oleic acid, abietic acid etc., long chain fatty mercaptans, long chain fatty amines, polyoxypropylene glycol, fatty sorbitan ester; sugar esters i.e. the alcoholysis reaction products of the methyl ester of a fatty acid and sucrose or raffinose; polysorbitol; methyl cellulose; ethoxylated phenol/formaldehyde resins and the like. Amounts ranging from about 0.01 part to 1.0 part of wetting agent per 100 parts of solution, may be used.

The two so-impregnated and dried bibulous materials are then arranged in superimposed relationship in the production of the final test indicators of the instant invention. It is preferred that they be attached to one another by applying an organic solvent soluble adhesive, permeable to oxaloacetic acid and the buffer used in the acid containing bibulous layer, to one side of one or both materials and pressing them together. Suitable adhesives include cellulose acetate, cellulose phthalate-acetate mixture, polyvinyl chloride, polyvinyl alcohol-acetate mixtures and the like.

Excellent results have been achieved by precoating one or both impregnated bibulous materials with a first layer of adhesive and drying before applying a second adhesive layer to effect final adhesion of the two materials together.

The main criteria for the adhesive system employed, because it covers the entire surface of either or both of the bibulous layers, is that only the oxaloacetic acid, which is produced when the L-aspartic acid and α-ketoglutaric acid come into contact with the SGOT in the first or acid bibulous layer, as well as the buffer in the acid-bibulous material layer, can pass therethrough and react with the diazonium salt in the second bibulous layer.

The mechanism by which the instant test indicators function, although not wishing to be bound by any expressed theory, is believed to occur thusly:

1. L-aspartic acid + α-ketoglutaric acid $\xrightarrow{SGOT}$ oxaloacetic acid + L-glutamic acid
2. Oxaloacetic acid + diazonium salt $_{(colorless)}$ → diazonium coupled product $_{(colored)}$ It can therefore be seen that once the SGOT is added to the test indicator, the glutamic oxaloacetic transaminase (GOT) therein causes a reaction which eventually results in the coupling of the diazonium salt, i.e. the formation of a colored indicator, the intensity of which is directedly proportional to the concentration of the GOT in the serum. The clinician merely compares the color which results to a standard color chart to ascertain the GOT concentration in the serum being tested.

The colors of the indicators of the present invention generally range from reddish-brown which is indicative of a high GOT level in the test serum to brownish-yellow which indicates a normal GOT level. A blank composed of 2.5 percent bovine albumin at pH 8.5 gives a light yellow spot.

The above concentrations expressed in connection with the components which may be incorporated into my novel indicators are set forth as to the solutions of these components which are saturated onto the bibulous carrier only and are not meant to specify the amount of each component which is eventually present on the bibulous carrier. That is to say, saturation of the bibulous carrier with specific concentration of a specific component in solution will not unequivocally incorporate into the bibulous carrier the same amount or percentage of component present in the solution. I have found however, that the above concentrations of solution are generally sufficient so as to incorporate sufficient component into the bibulous material upon saturation therewith to produce a functional test indicator, the absorptive capabilities of the bibulous material being characteristic of materials generally used for this purpose.

Although the above discussion with regard to the preparation of my novel indicators teaches saturation of the bibulous material by dipping, it is sometimes necessary, especially wherein a series of saturations are to be conducted, to apply the component solution to the bibulous carrier rather than dipping the carrier because extended dippings may tend to wash out previously deposited components.

The following examples are set forth for purposes of illustration only and are not to be construed as limitations on the present invention except as set forth in the appended claims. All parts and percentages are by weight unless otherwise specified.

EXAMPLE 1

A. Preparation of Acid Bibulous Layer

A Whatman No. 3 paper strip is prewashed with 0.01 N hydrochloric acid solution, followed by rinsing with distilled water and air drying. The resultant paper is then dipped into an aqueous 0.15 M phosphate buffer ($K_2HPO_4$), pH 9.0, which contains 0.05 molar L-aspartic acid, 0.01 molar α-ketoglutaric acid and 0.1 percent of a commercially available polyoxyethylene lauryl ether wetting agent. After standing in this solution for 5 minutes, the paper is removed. The excess liquid is drained off and the paper is then dried in a current of cool air.

B. Preparation of Diazonium Bibulous Layer

A prewashed, as above, No. 3 Whatman paper strip is dipped into an aqueous solution containing 0.3 percent of a diazonium salt corresponding to Formula I, above, wherein $R_1$ is 2-methoxy, $R_2$ is 4-$NHCOC_6H_5$, $R_3$ is 5-methyl and $X^-$ is $Cl^-$, 0.1 percent of the above-mentioned wetting agent and 3.0 percent of soluble starch. The starch was added to the water and the resultant suspension was boiled and then cooled before the diazonium component was added thereto. The final pH of the solution was then adjusted to 4–4.5 with dilute hydrochloric acid. After standing several minutes in this solution, the treated strip is removed. Excess solution is drained off and the strip dried under vacuum in the dark.

C. Binding of Component Strips

The above-prepared acid strip is precoated with a 5 mm thick film of cellulose acetate solution comprising 10 percent cellulose acetate dissolved in ethyl acetate and containing 0.1 percent of the same wetting agent described above. The strip is air dried and a second coat of the same adhesive solution is added to the strip and, while still wet, is pressed onto the diazonium strip prepared above. The strips are placed between two flat metal plates and light pressure (~15 lbs.) is applied thereto for about 15 minutes. The resultant bonded strips are removed from the plates and placed in a stream of air (in dark) to remove the last traces of adhesive solvent. The resultant test indicator is treated with sera containing different concentrations of GOT and the intensity of the red-brown spot that develops is found to be proportional to the concentration of enzyme present in the sera when compared to a standardized chart.

EXAMPLES 2–18

Following the procedure of Example 1, various diazonium salts are incorporated into a bibulous paper strip and formulated into test indicators as described therein. In each instance, the recovered test indicator accurately determines the concentration of GOT in the serum specimen tested. The salts are set forth in Table I, below.

TABLE I

| Example | Diazonium Salt | | | |
|---|---|---|---|---|
| | $R_1$ | $R_2$ | $R_3$ | $X^-$ |
| 2 | 2—Cl | H | H | $BF_4^-$ |
| 3 | 2—Cl | 5—Cl | H | ½$MgCl_2$ |
| 4 | H | H | 4—$NO_2$ | $BF_4^-$ |
| 5 | 2—$NO_2$ | 4—Cl | H | ½$AlCl_3$ |
| 6* | H | 2—$CH_3$ | H | $BF_4^-$ |
| 7 | 2—$CH_3$ | 3—Cl | H | $BF_4^-$ |
| 8 | 2—$CH_3$ | 4—$NO_2$ | H | p—$CH_3C_6H_4SO_3^-$ |
| 9 | H | 2—$NO_2$ | 4—$CH_3$ | do. |
| 10 | H | H | 2—$OCH_3$ | $BF_4^-$ |
| 11 | H | 2—$OCH_3$ | 4—Cl | do. |
| 12 | 2—$OCH_3$ | 4—$NO_2$ | H | do. |
| 13 | 2—$NO_2$ | 4—$OCH_3$ | H | do. |
| 14** | 5—$CH_3$ | 2—$OCH_3$ | H | ½$ZnCl_2$ |
| 15 | 3—$OCH_3$ | 4—$NHCOC_6H_5$ | 6—$OCH_3$ | $BF_4^-$ |
| 16 | 2—Cl | 4—$NHCOC_6H_5$ | 5—$OCH_3$ | $Cl^-$ |
| 17 | 2—$OC_2H_5$ | 4—$NHCOC_6H_5$ | 5—$OC_2H_5$ | $Cl^-$ |
| 18 | 3—$NHCOC_6H_5$ | 4—$CH_3$ | 6—$CH_3$ | $Br^-$ |

\* = polyvinyl chloride adhesive used
\*\* = cellulose phthalate-acetate mixture adhesive used

EXAMPLE 19

The procedure of Example 3 is again followed except that the starch is replaced by urea. Similar results are observed.

EXAMPLE 20

The procedure of Example 17 is again followed except that the starch is replaced by a 50/50 mixture of starch and urea. Substantially identical results are attained.

I claim:

1. A diagnostic test indicator for the detection and concentration determination of glutamic oxaloacetic transaminase in sera comprising a pair of bibulous materials the first of which contains therein, at a pH of from about 6.5 to about 9.5, the dried residue resulting from the impregnation thereof with
    1. L-aspartic acid and
    2. α-ketoglutaric acid and the second of which contains therein, at a pH of from about 2.5 to about 4.5, the dried residue resulting from the impregnation thereof with
    3. a diazonium salt, said bibulous materials being positioned in superimposed relationship and adhered to one another with a cellulose acetate adhesive, said adhesive covering the entire adhering surface of either or both of the bibulous materials.

2. A diagnostic test indicator according to claim 1 wherein said (3) is a 2-methoxy-4-benzamido-5-methyl diazonium salt.

3. A diagnostic test indicator according to claim 1 wherein said first bibulous material also contains a buffer.

4. A diagnostic test indicator according to claim 1 wherein said second bibulous material also contains starch, urea or a mixture thereof.

5. A diagnostic test indicator according to claim 3 wherein said buffer is a phosphate buffer.

6. A diagnostic test indicator according to claim 1 wherein said bibulous materials are paper.

7. A process for the preparation of the diagnostic test indicator of claim 1 which comprises (A) impregnating a first bibulous material with an aqueous solution of said (1) and (2), (B) thereafter drying the thus impregnated first material, (C) impregnating a second bibulous material with an aqueous solution of said (3), (D) thereafter drying the thus impregnated second material, (E) coating the entire surface of one side of at least one of said bibulous materials with a solution of cellulose acetate adhesive, (F) thereafter drying all of the resultant coated surfaces, (G) applying a second coating of a solution of cellulose acetate adhesive to all of the resultant, dried coated surfaces, and (H) combining the thus coated first and second materials in superimposed relationship.

8. A process according to claim 7 wherein said (3) is a 2-methoxy-4-benzamido-5-methyl diazonium salt.

9. A process according to claim 7 wherein said solution of (1) and (2) is buffered to a pH of from about 7.5 to about 10.0.

10. A process according to claim 9 wherein said buffer is a phosphate buffer.

11. A process according to claim 7 wherein said solution of (3) contains starch, urea or a mixture thereof.

12. A process according to claim 7 wherein said bibulous materials are paper.

* * * * *